June 26, 1923.
G. W. CLARK
CYCLE
Filed March 7, 1921
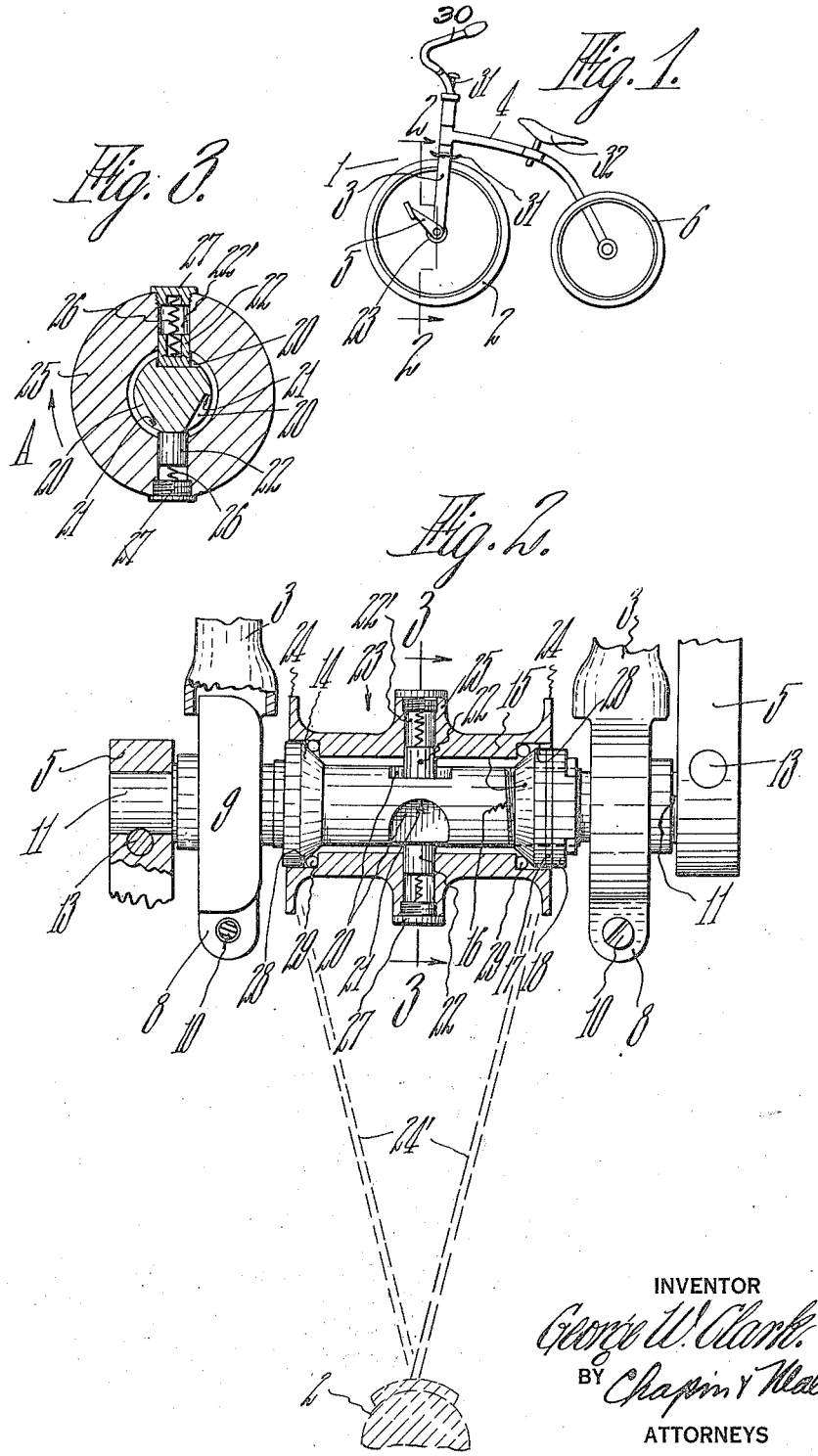
INVENTOR
George W. Clark.
BY Chapin & Neal,
ATTORNEYS Patented June 26, 1923.

1,460,052

UNITED STATES PATENT OFFICE.

GEORGE W. CLARK, OF WESTFIELD, MASSACHUSETTS, ASSIGNOR TO WESTFIELD MANUFACTURING COMPANY, OF WESTFIELD, MASSACHUSETTS, A CORPORATION OF MASSACHUSETTS.

CYCLE.

Application filed March 7, 1921. Serial No. 450,258.

*To all whom it may concern:*

Be it known that I, GEORGE W. CLARK, citizen of the United States, residing at Westfield, in the county of Hampden and State of Massachusetts, have invented new and useful Improvements in Cycles, of which the following is a specification.

This invention relates to improvements in cycles and more particularly to a "free wheel" drive mechanism for children's velocipedes and the like.

Among the several objects of the invention, is to provide a simple and inexpensive construction of this character which may be readily applied to the driving wheel of a child's velocipede or cycle and enable the child to coast or drive at will without removing its feet from the driving pedals. To control the coasting of the cycle, any suitable hand-brake may be employed having an independent action on one of the wheels of the cycle.

Further objects and advantages of the invention will become apparent from the following description and accompanying drawings, which illustrate the preferred embodiment of the invention and in which:

Fig. 1 is a side elevational view of the cycle embodying my invention;

Fig. 2 is an enlarged sectional view taken on the line 2—2 of Fig. 1; and

Fig. 3 is a cross-sectional view taken on the line 3—3 of Fig. 2.

Referring more particularly to the drawings,—1 represents a velocipede suitably adapted for the application of the present invention, comprising a frame 4, rear wheels 6, and front driving wheel 2. The driving wheel 2 is mounted in the wheel fork 3, the latter being swivelly carried in the frame 4 and connected to the handle-bar 30 for being steered in the usual manner. A suitable hand-operated brake 31 may be mounted on the frame as shown, for acting on the tread of the wheel 2. 32 indicates the saddle or seat for the rider.

Mounted for rotation in the lower ends of the fork 3 is the crankshaft 11 having fixed to its opposite ends the pedal-cranks 5, such as by cotter-pins 13. Preferably, roller or ball-bearings are provided for the mounting of the crankshaft 11, and such bearings indicated at 9, are clamped in split collar portions 8 at the lower ends of the fork arms 3, suitable clamping bolts 10 being employed to firmly secure the bearings in place.

The wheel 2 through its hub 23 is rotatably mounted on the drive-shaft 11 and ball-bearings are also preferably employed for this mounting. As shown, spaced bearing cones 14 and 15 are secured to the drive-shaft 11, the cone 15 preferably being adjustable thereon by screw-threaded engagement therewith at 16. An abutting lock-nut 18 and washer 17 secure the adjustment. The balls 29 are interposed between the cones 14, 15 and cup-bearing portions of the wheel hub 23. The flanges 24 of the hub 23 are connected to the rim of the wheel 2 by spokes 24' in the usual manner.

Preferably housed midway between the spaced bearings 14 and 15 is a clutching mechanism for connecting the drive-shaft 11 to the wheel hub 23 for driving the latter from the former and permitting the wheel to overrun the drive-shaft in a forward direction only. By mounting the clutching mechanism substantially midway between the bearings of the wheel and the shaft, the simplicity and accessibility of the parts are enhanced and a more balanced wear upon the bearings is obtained.

In the preferred embodiment shown, this clutching mechanism comprises one or more pawl members, two being shown, in the form of cylindrical plugs 22 slidably mounted in radially-disposed recesses 22' in a central flange or enlargement 25 of the hub 23. The pawls or plugs 22 are spring-pressed inwardly at all times by springs 26, and the outer ends of the recesses 22' are closed by caps 27 against which the outer ends of the springs 26 are seated. Notched portions 20 with shoulders 21, at one end thereof, somewhat similar to ratchet teeth, are formed in the drive-shaft 11 in position to be engaged by said pawls or plugs 22 and, as shown in Fig. 3, three of said notched portions are distributed about the drive-shaft 11.

In driving the wheel 2 from the crank-shaft 11, which is in a forward direction only, the pawls 22 will engage with the shoulders 21 of the notches 20 as shown in Fig. 3, the arrow A indicating the direction of the assumed rotation of shaft 11. It will be obvious from this view that the wheel hub 23 may freely overrun the shaft 11 and that the pawls 22 will merely ride over the notches 20 in slight frictional engagement. In other words, the wheel 2 may freely rotate relative to the shaft in one direction only, which is the forward direction.

By this construction, a child may either drive its velocipede forward or hold its feet still at any time and coast, and by the application of the hand-brake may control its coasting speed to the point of safety. Thus, a device of new character is provided in an old toy to arouse interest in the child and widen its field of play and enjoyment.

What I claim is—

1. In a cycle, a drive shaft, a driven wheel mounted thereon comprising a hub with spaced apart spoke flanges, said hub having a recessed portion centrally disposed between said spoke flanges, and a one way clutching means to provide balanced driving mechanism for said wheel comprising elements on said driven wheel housed in said centrally disposed recess adapted to interconnect with elements on said drive shaft to permit rotation of the driven wheel relative to the drive shaft in one direction and to prevent rotation of the driven wheel relative to the drive shaft in the opposite direction.

2. In a cycle, a drive shaft, a driven wheel mounted thereon comprising a hub with spaced apart spoke flanges, said hub having a recessed portion remote from said spoke flanges, and clutching means housed in said recess and arranged to permit free rotation of said wheel relative to said shaft in one direction only, said clutching means comprising a pawl member movably mounted in said recess coacting with a ratchet formed on said drive shaft.

3. In a cycle, a drive shaft, a driven wheel mounted thereon comprising a hub with spaced apart spoke flanges, said hub having a recessed portion remote from said spoke flanges, and clutching means housed in said recess and arranged to permit free rotation of said wheel relative to said shaft in one direction only, said clutching means comprising a radially movable spring pressed pawl member mounted in said recess coacting with a ratchet formed on said drive shaft.

4. In a cycle, a drive shaft, a driven wheel mounted thereon comprising a hub with spaced apart spoke flanges, said hub having a recessed portion remote from said spoke flanges, and clutching means comprising a radially movable spring pressed pawl member mounted in said recess coacting with a ratchet formed by teeth cut inwardly from the peripheral surface of said drive shaft.

5. In a cycle, a drive shaft, a driven wheel mounted thereon comprising a hub with spaced apart spoke flanges, said hub having a portion remote from said spoke flanges formed with a radially disposed recess having a removable closure for its outer end and clutching means between said drive shaft and wheel arranged to permit free rotation of said wheel relative to said shaft in one direction only, said clutching means comprising a radially movable spring pressed pawl member mounted in said recess coacting with a ratchet formed on said shaft.

6. In a cycle, a drive shaft, a driven wheel mounted thereon comprising a hub with spaced apart spoke flanges, said hub having a portion remote from said spoke flanges formed with a radially disposed recess having a removable closure for its outer end and clutching means between said drive shaft and wheel arranged to permit free rotation of said wheel relative to said shaft in one direction only, said clutching means comprising a radially movable spring pressed pawl member mounted in said recess coacting with a ratchet formed by teeth cut inwardly from the peripheral surface of said drive shaft.

In testimony whereof I have affixed my signature.

GEORGE W. CLARK.